United States Patent [19]

Franzolini

[11] Patent Number: 4,489,266
[45] Date of Patent: Dec. 18, 1984

[54] CIRCUIT AND A METHOD FOR PROCESSING AMPLITUDE AND PHASE VARIABLE MULTIPHASE SIGNALS, WHICH ARE REQUIRED AS CURRENT OR VOLTAGE REFERENCE TO DRIVE SYNCHRONOUS MOTORS

[75] Inventor: Luciano Franzolini, Milan, Italy
[73] Assignee: SP, EL. s.r.l., Italy
[21] Appl. No.: 476,466
[22] Filed: Mar. 18, 1983

[30] Foreign Application Priority Data

Mar. 23, 1982 [IT] Italy ............................... 20337 A/82

[51] Int. Cl.³ .................................................. H02P 1/40
[52] U.S. Cl. ...................................... 318/800; 318/801
[58] Field of Search ............................ 318/798–811, 318/721–723, 312–320

[56] References Cited

U.S. PATENT DOCUMENTS

| | | | |
|---|---|---|---|
| 3,551,766 | 3/1967 | Stemmler | 318/721 |
| 3,588,645 | 7/1968 | Gilmore | 318/721 |
| 4,085,355 | 4/1976 | Fradella | 318/721 |
| 4,158,801 | 6/1979 | Hirata | 318/801 |
| 4,259,628 | 3/1981 | Iwakane et al. | 318/799 |
| 4,358,726 | 11/1982 | Iwakane et al. | 318/806 |
| 4,382,217 | 5/1983 | Horner et al. | 318/799 |

Primary Examiner—E. A. Goldberg
Assistant Examiner—A. Evans
Attorney, Agent, or Firm—Lane, Aitken & Kananen

[57] ABSTRACT

This invention relates to a circuit and to a method for processing amplitude and phase variable multiphase signals, which are required as current or voltage reference to drive electric motors, comprising a synchro-resolver angular position transducer, rigidly connected with a synchronous motor with the same polar configuration and number of poles thereof, according to which the analog signals detected by said transducer are modulated, demodulated and outputted out of phase by 90° with the signals relating to the rotating magnetic field. The circuit moreover comprises a phase shifter device and means for modifying the amplitude of signals outputted by said transducer as a function of at least one control signal. The resultant of the signals processed by said means is supplied to an amplifier to generate in the stator currents of determined amplitude and phases for driving said motor complying with the magnetic laws thereof.

8 Claims, 12 Drawing Figures

CIRCUIT AND A METHOD FOR PROCESSING AMPLITUDE AND PHASE VARIABLE MULTIPHASE SIGNALS, WHICH ARE REQUIRED AS CURRENT OR VOLTAGE REFERENCE TO DRIVE SYNCHRONOUS MOTORS

This invention relates to a circuit and a method for processing amplitude and phase variable multiphase signals, which are required to drive electric synchronous motors for presetting servosystems, in which the motor is not a D.C. brush motor, but a suitably interlocked synchronous motor.

In the last few years, particularly in the field of servosystems for operating machines, such as machine tools, robots, special machines, it is highly required to provide servosystems, in which use is made of a synchronous motor having permanent magnets interlocked by a drive with static switching of the phases. Without fail, this is preferable to the use of D.C. brush motors requiring a considerable maintenance and which are not reliable. Thus, this type of motor is made explosion-proof with difficulty and cannot operate at high speeds in conjunction with high torques due to switching problems, etc.

The drive of synchronous motors by multiphase alternating current requires that said alternating current varies in amplitude, frequency and phase in order to comply with the magnetic laws of the motor to obtain optimum performances.

It is the object of the servosystem to generate current waves, and accordingly rotating magnetic fields, in the stator of the synchronous motor which, combined with the polar torque of the rotor, generate rotating or plugging torques. When varying the angular speed of these rotating fields, the rotor speed is varied; when varying the amplitude of these rotating fields, a change is caused in the strength of the torque. In order to avoid the shutdown of the motor, it is necessary that the phase between the rotary vector of the stator magnetic field and the phase of the rotor pole magnetic field does not exceed a maximum angle of 90°. As a result, the currents to be generated within the stator should take account of these restraints. Therefore, it is essential to know at any time the position of the rotor relative to the stator.

The prior art devices essentially use rotor position sensors which are arranged at particular locations and supply the signals thereby detected to a microprocessor.

A first system uses "Hall effect cells" as position sensors. This system is quite reliable for high speed rotating motors, but is inadvisable for quality servomotors which are to ensure good performances for speeds in the range from 0.1 up to 6000 r.p.m. Thus, these "Hall effect cells" divide the round angle, and accordingly detect the angular position of the stator, into a limited number of parts. As a result, the angular movement and accordingly the angular rotation of the reference vectors is a step rotation. At high speed, this step rotation is not detected due to the inherent inertias, but at low speed these signals provide a stepped motor operation.

A second system provides the installation of an incremental encoder. In this case, the angular position of the rotor magnets can be determined with increased definition. Said definition depends on the accuracy and on the encoder number of divisions. Also in this case, the advancements at very low speed are affected by the quantization of the round angle, whereby the operation would tend to become a pulse operation. Moreover, this is an incremental type of system and auxiliary initial synchronization systems are needed. Finally, the encoder is highly effected by disturbances.

A third system provides the absolute detection of the angular position of the stator by means of a "resolver", the value of which is then digitized through a quite costly demodulation to obtain a digital value of the angular position to be processed by the micro-processor.

A fourth system provides the use of shaped cams, the position of which is sensed by suitable magnetic or capacitive sensors.

The first three devices are extremely complicated, of high cost and provide a step operation rather than a continuous operation since, due to the digital angular detection, the number of angular divisions of the detecting system is limited.

The fourth system has accuracy limitations. It may be used only for approximate detections of angular position and is strictly bonded to the constructive characteristics of the motor.

It is the object of the present invention to provide a circuit for generating amplitude and phase variable multiphase signals, enabling to drive "any" synchronous motor so that said motor has the performances of a direct current motor, is reliable for very low and high speeds (for example, from 0.1 up to 6000 r.p.m.) and for a continuous and non-stepped operation.

It is a further or auxiliary object of the invention to provide an analog circuit capable of detecting and processing all of the values corresponding to each angular value of the rotating magnetic field.

It is still a further object to provide a circuit of reduced cost and simple implementation and installation on any synchronous motor.

It is another object to provide a simple process or method by using characteristic elements of the circuit implemented for the initial (mechanical) timing of the transducer means relative to the motor, since the circuit may be installed on any type of motor, also a motor without polar references. It is another object to allow the use of only one transducer for all of the functions generally required by a good servomechanism, that is:
- polar angular positioning of the magnetic vectors;
- accurate detection of the angular speed (tachymetrical function) with elimination of the tachymetrical dynamo; and
- absolute accuracy control of the angular position (space loop).

According to the invention, the object is achieved by providing a circuit comprising a synchro-resolver type of angular position transducer rigidly connected with the rotor of the synchronous motor, and 90 polar degrees out of phase, the detected analog signals of which are modulated, demodulated and outputted 90° out of phase with those relating to the rotating magnetic field; a phase shifter device and means for modifying the amplitude and polarity of the signals outputted by the transducer as a function of at least one control signal, in which the resultants of the signals processed by a said means are supplied to an amplifier for generating currents of determined amplitude and phase in the stator for driving said motor, complying with the magnetic laws thereof.

An embodiment of the invention provides that said phase shifter device comprises a circuit including impedances and at least one switching element or changeover switch for each phase which is operated by a digital signal.

Another solution provides that the means for modifying the signal amplitude comprise multiplier means.

A solution provides that said multiplier device is connected downstream the phase shifter circuit.

Another solution provides that said multiplier device is connected upstream the transducer, so as it modifies the amplitude of the transducer carrier and accordingly the signals successively outputted.

The invention will now be described with reference to the accompanying drawings, in which.

Figure 1:
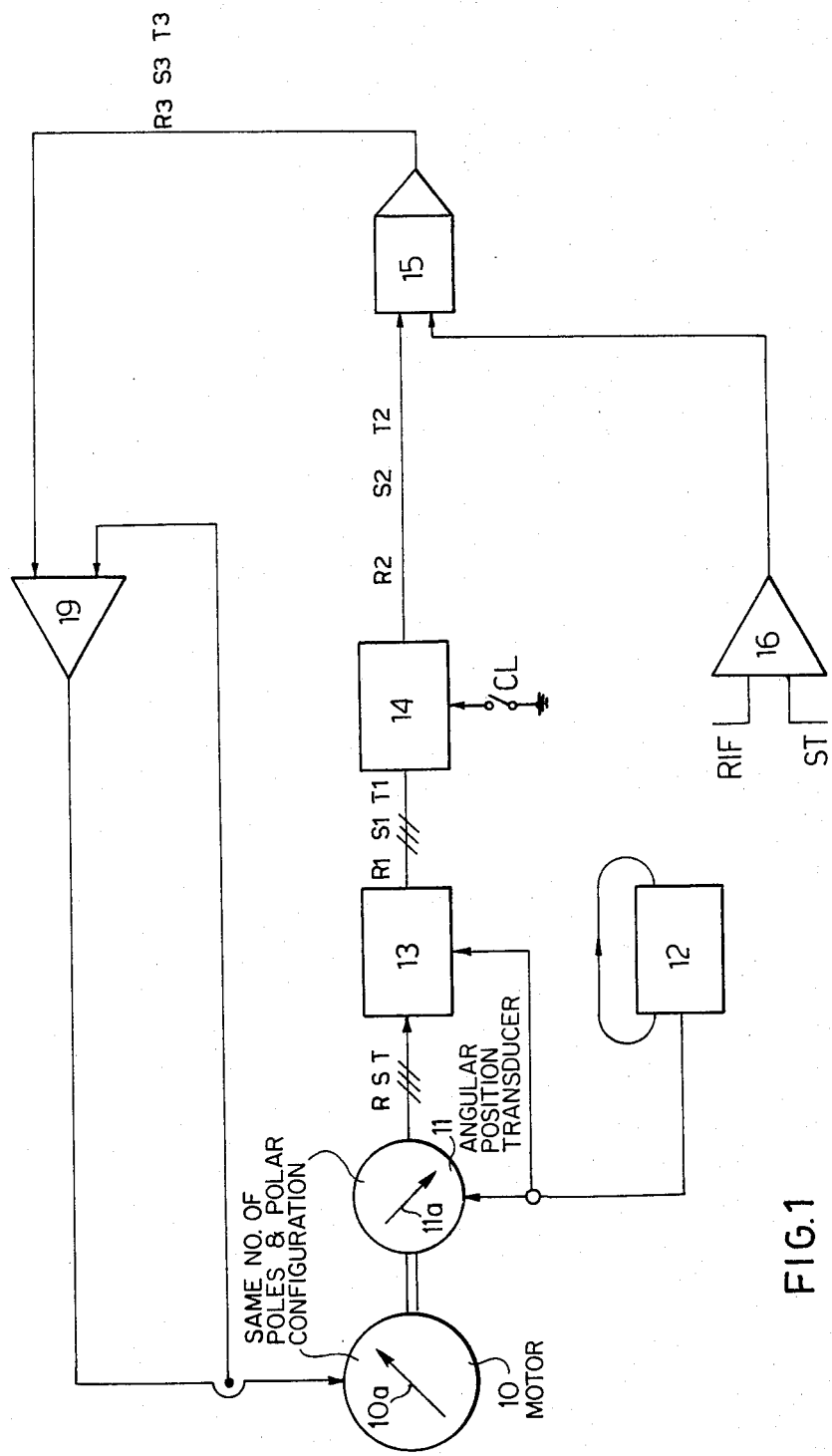
FIG. 1 is a schematic view showing an exemplary embodiment of the circuit according to the invention.

The circuit according to this application provides that the analog signal from the transducer, for example a synchro is directly utilized by a simple analog processing to generate the multiphase reference signals required by the power amplifier in order to generate the currents in the stator windings determining the required rotating torque.

The term "snychro type of angular position transducer" will be herein referred to a transducer similar to a small motor acting as a variable coupling transformer, wherein the rotor is wound up in single phase connection and the stator is wound up in three phase connection, that is at 120°. A resolver type of angular position transducer differs from a synchro type only in that the stator is wound up according to a two-phase connection at 90°.

The motor axis 10 is connected to the angular position transducer 11, which has the same polar configuration and number of poles as the motor. The transducer 11 is supplied by a medium frequency oscillator device 12, for example at 10 KHz. The polar axis, represented by arrow 11a of the transducer 11 is mechanically aligned at 90°, as it will be explained in detail, with the rotor polar axis, represented by arrow 10a for the three-phase synchronous motor 10. The outputs of transducer 11, which in this case are three-phase outputs, for convenience referred to as R, S, T, are then demodulated by the demodulator 13, that is the 10 KHz component is removed. The output vectors R1, S1 and T1, which are the resultant of the rotary vectorial system with vectors 120° out of phase in case of a three-phase system (or 90° in case of a two-phase system), but always strictly related to the polar axis of the rotor. The angular rotational speed of vectors R1, S1 and T1 is exactly the same as the angular rotational speed of the motor rotor.

As above mentioned, in order to provide a torque for rotating, stopping or inverting the motor rotor, vectorial reference signals are required, such signals being phase and amplitude variable relative to the polar torque (or polar torques) of the motor. Therefore, there is the need of creating currents generating a lead angle polar stator field (which will be herein meant in the same required direction of rotation) if the motor is to be operated as a motor, or a lug polar stator field (in this case meant in opposite direction to the required rotation), when desiring to operate said motor as a generator, with respect to the reference rotor polar axis.

Figure 3A:
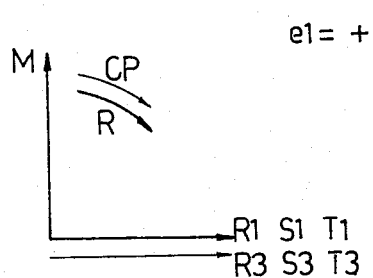
FIGS. 3A, 3B, 3C and 3D are views showing the four possible polar conditions for the magnetic vectors.

Should the transducer be initially mechanically positioned with a polar axis at 90° relative to the polar axis of the rotor, by modalities and means to be explained in detail in the following, it may be conventionally considered that, in case of clockwise rotation R of the motor (that is operating as a motor by supplying a drive couple (CP), the signals R1, S1 and T1 are used as such as current reference, that is without any polarity inversion or phase rotation (situation in FIG. 3A).

Figure 3B:
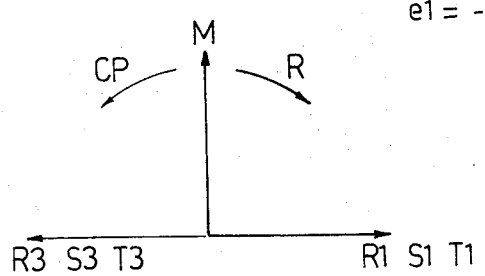
Figure 3C:
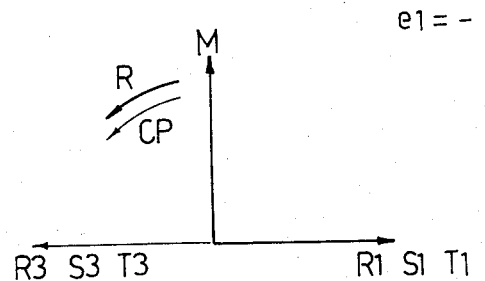
Figure 3D:
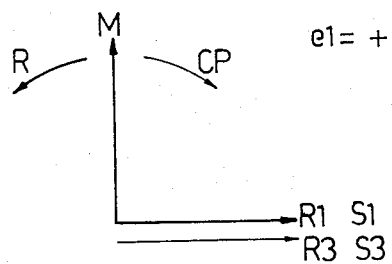

Still conventionally, in case of clockwise rotation, when desiring to obtain a plugging couple (operating as generator) it will suffice to invert the polarity of the individual phases (rotating the same through 180°), as shown in FIG. 3B. FIGS. 3C and 3D show equivalent situations with anticlockwise rotation. In all of these figures, M is the polar axis for the motor rotor.

Polarity inversion is accomplished by the multiplier device 15, in which e1, representing the speed error signal, determines by its sign the vector phase and by its absolute value the modulus or amplitude of the current values or references. The function of the phase shifter device 14 will be illustrated in the following.

e1 may be an error signal referred to any quantity, such as a speed, a torque, a pressure and so on. By mere way of example, FIG. 1 shows e1 which is the result of a comparison made by a comparator 16 between a tachymetrical signal ST and a reference signal RIF.

Figure 4:
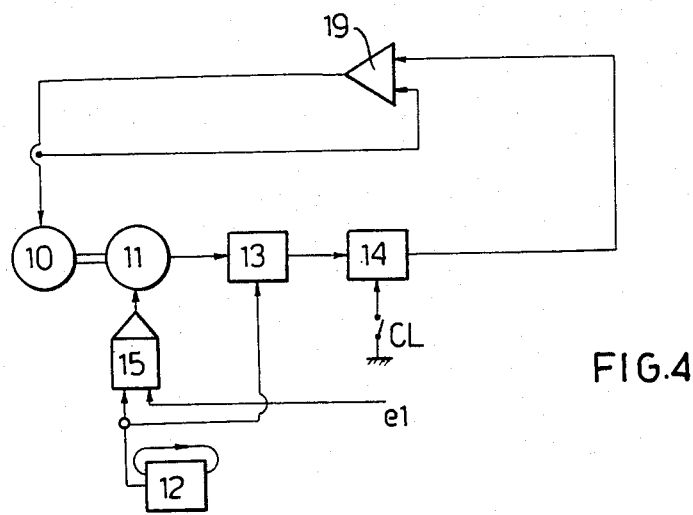
FIG. 4 is a view showing another exemplary embodiment of a circuit according to the invention.

FIG. 4 shows a further variant of the circuit according to the invention. Such a figure shows that said multiplier device 15 may be arranged at the beginning of the processing loop upstream the transducer. It modifies the amplitude of the carrier supplied to the transducer 11 and obviously the amplitude of R1, S1 and T1 that are supplied to the phase shifter device as already with modified amplitude.

Thus, it will clearly appear that this multiplier device can be arranged at any location of the processing loop without the final result being altered.

An adjustment in the amplitude of the signals supplied to the amplifier 19 can thus be made, so as to accurately adjust the motorspeed, even for very low speeds, of continuous type.

Figure 5:
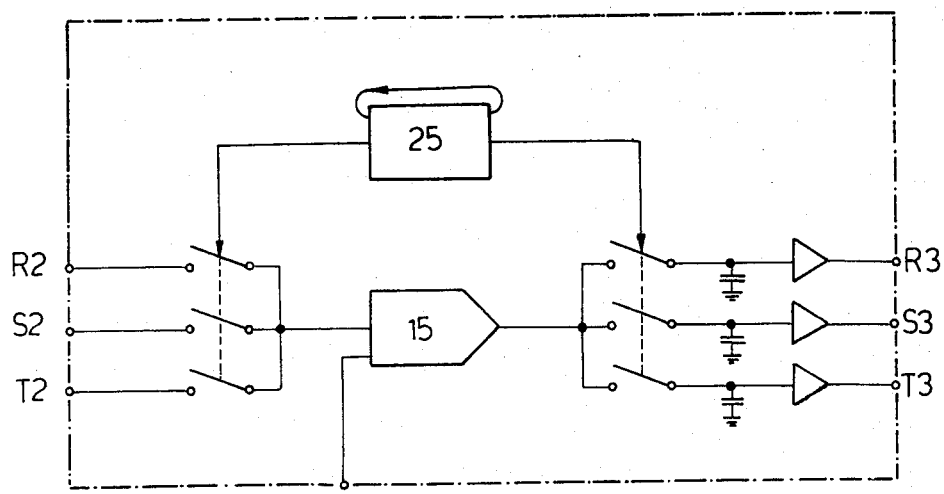
FIG. 5 is a view showing an exemplary embodiment of a multiplier circuit having only one multiplying element.
Figure 6:
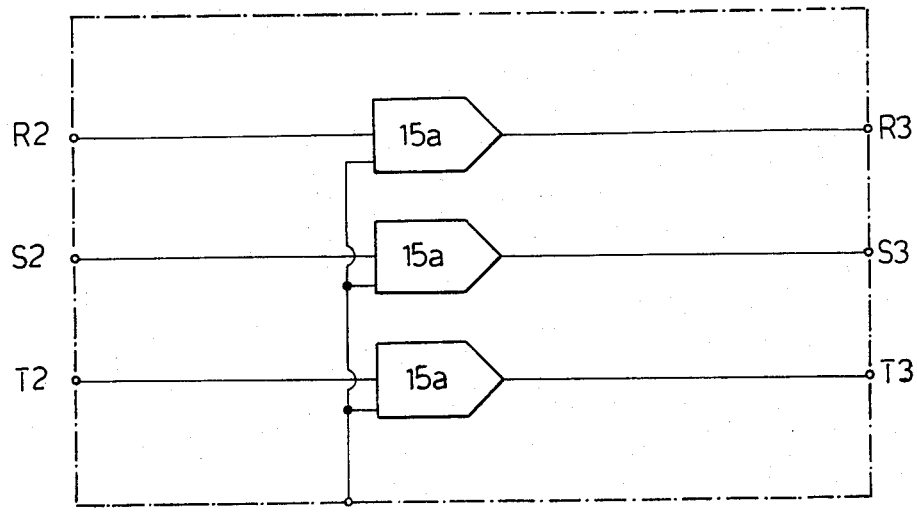
FIG. 6 is a view showing an exemplary embodiment of a multiplier circuit having the same number of multiplying elements as the number of phases, three in this case.

Several embodiments may be provided for the multiplier device. A first embodiment is shown in FIG. 5, in which only one multiplying element 15 for the three phases and a multiplexer 25 are used. A second embodiment is shown in FIG. 6, in which as many multiplying elements 15a, 15b and 15c as the phases are used, three in this case.

The use of only one multiplying element provides advantages in construction and long term stability of the circuit, as it is an element physically common to all the phases.

Figure 7:
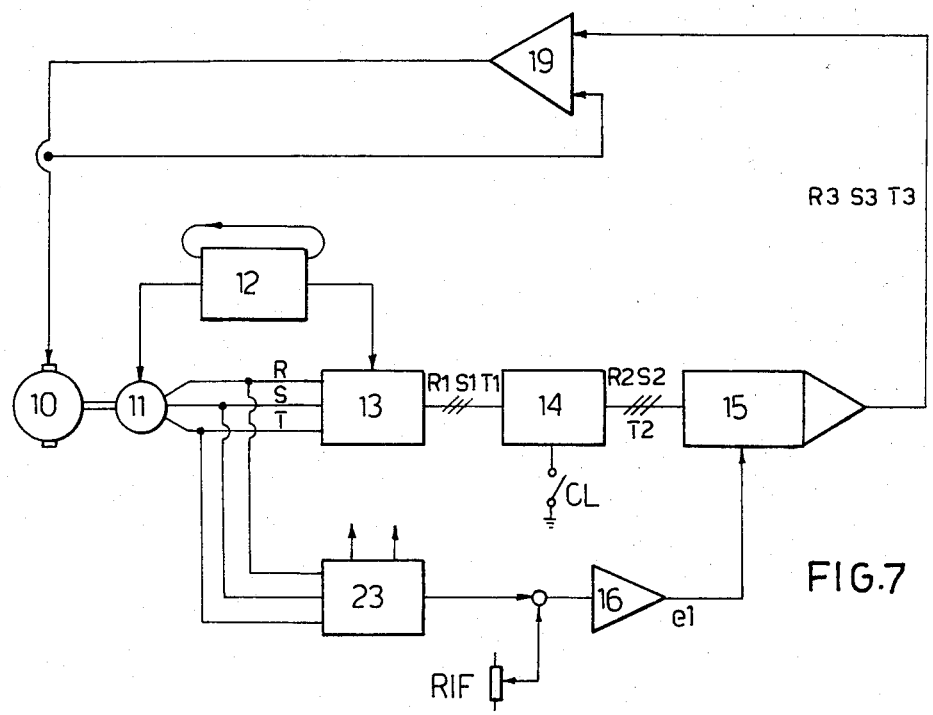
FIG. 7 is a view showing a circuit according to the invention characterized by the use of only one transducer for the control of phases, speed and motor position.

FIG. 7 shows the circuit according to the invention in which, by the only transducer provided, in this case a synchro type transducer connected to a (commercially type of) synchro-digital converter 23, in addition to the above mentioned vectorial functions, as required for motor drive, the speed-function and space-function are obtained, that is the absolute measurement of the angle of rotation for the rotor relative to the stator. Said system is commonly used for position measurement on tool machines.

Figure 8:
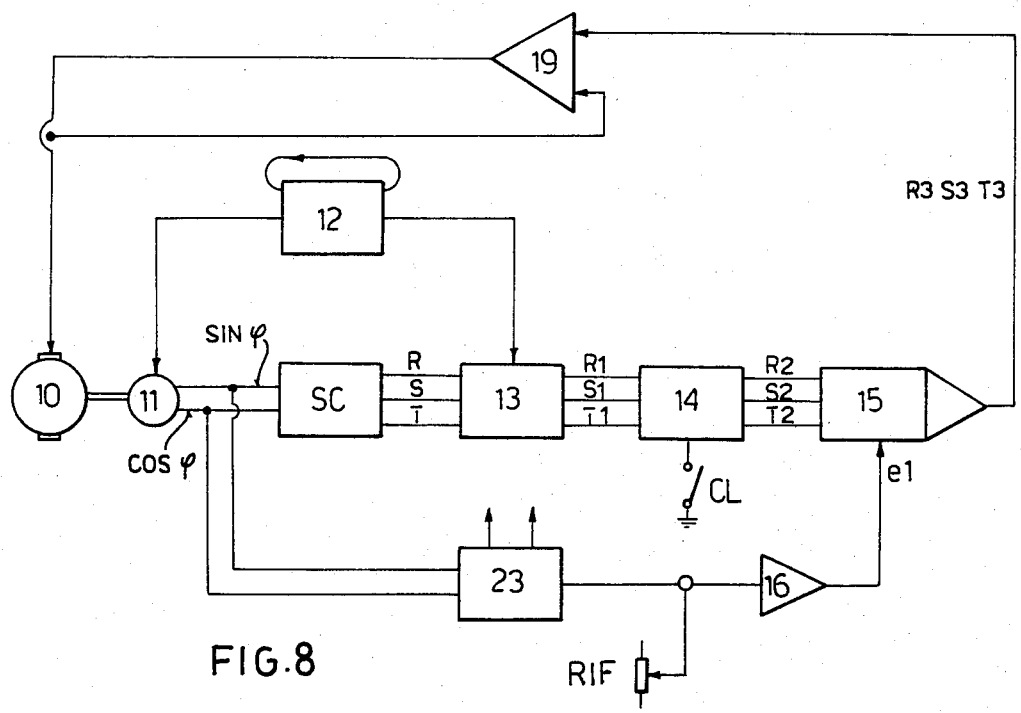
FIG. 8 is a view showing a circuit having the same functions as that of FIG. 1, but using a Scott transformer.

FIG. 8 shows a circuit like that of FIG. 7, in which a two phase resolver transducer 11 is used; the two-phase signals are converted to three-phase signals by means of a Scott transformer SC. For these two last applications the transducer should be of accuracy type. Similar transformations can be provided for multi-phase systems.

Similar operations can be carried out when availing a three-phase system and desiring to operate in a two-phase or in a multi-phase system.

Figure 2A:
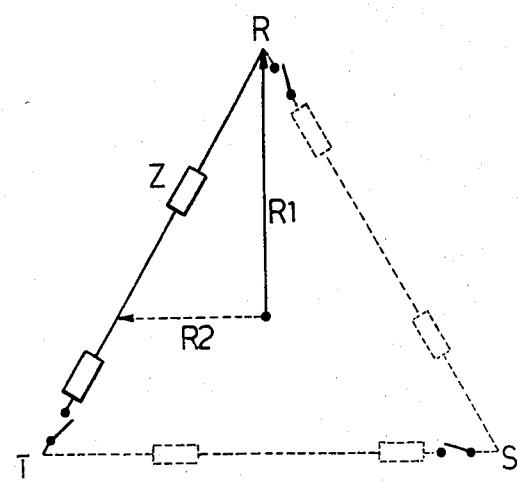
FIG. 2A is a view showing the possible phase displacement for the phase of vector R.
Figure 2B:
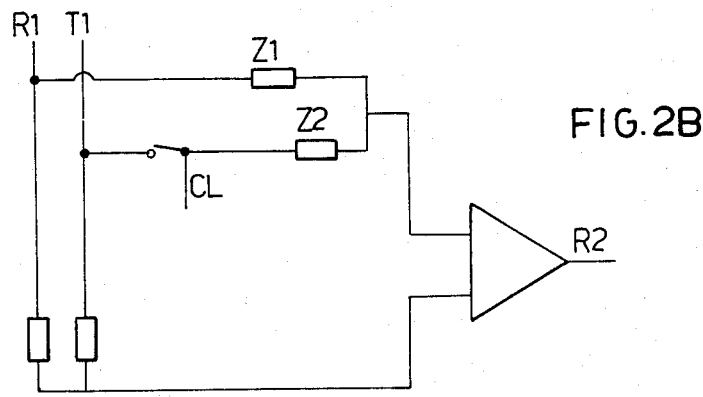
FIG. 2B is a view showing a possible embodiment of the phase shifter circuit for the phase R of the vector of FIG. 2A.

The circuit also provides a phase shifter 14 for (conventionally) shifting in delay or logging by 90° the signals R1, S1 and T1 by means of the digital control signal CL. This circuit is shown in FIG. 2A.

This device is advantageous when desiring to accurately mechanically shift the motor rotor with the transducer, either of synchro or resolver type. Thereby, this circuit can be used with any synchronous motor, of which the angular position of the magnetic poles is not known.

The retrieval for the respective polar phases is facilitated by operating as follows:

(1) the phase shifter is operated on by the digital control CL dephasing or shiffing by 90° the phases R1, S1 and T1, that is (R1, S1, T1)−90°=(R2, S2, T2). See FIG. 2A;

(2) The polar axis of the transducer is locked and the motor rotor is allowed to freely rotate;

(3) the motor is energized; now the motor rotor will rotate until its polar axis is aligned with the polar axis resulting in the stator from the reference vectors R3, S3 and T3 which are out of phase by 90, with respect with the polar axis of the transducer. Upon alignment completion, the rotor stops due to lack in torque.

(4) The motor rotor and transducer are rigidly blocked.

(5) The state of the digital control signal CL is modified. The phases R3, S3, T3=R1, S1, T1 will be rotated by 90° in advance relative to the polar axis of the motor.

It will clearly appear that this practical circuit can be advantageously used and enables to achieve all of the intended objects.

Particularly, the same angular transducer is used for phase generation and speed and position detection.

What I claim is:

1. A circuit for generating amplitude and phase variable multiphase signals, which are required as current or voltage to drive an electric synchronous motor comprising a synchronous motor having a rotor and a stator, a multiphase angular position transducer of a precision synchro-resolver type having a rotor rigidly connected to the rotor of said motor, with the same polar and configuration and number of poles as said motor, but with its polar axis mechanically out of phase by 90 degrees with the polar axis of said motor, said transducer generating analog modulated signals representing the angular position of the rotor of said transducer in a rotary vectorial system, demodulator means to demodulate the output signals of said transducer to produce demodulated signals representing angular position in said rotary vectorial system, phase shifting means for shifting the angular position represented by said demodulated signals in said rotary vectorial system, signal modifying means for modifying said demodulated signals in accordance with a control signal, and an amplifier connected to receive the demodulated signals as modified by said modifying means and generating in the stator of said motor currents of determined amplitude and phase to drive said motor in accordance with the signals received from said amplifier.

2. A method to be carried out in a circuit for generating amplitude and phase variable multiphase signals which are required as current or voltage reference to drive an electric synchronous motor, to provide an initial mechanical phase shifting at 90 degrees between a rotor of said motor and a rotor of a multiphase angular position transducer of the synchro-resolver type, said transducer producing output signals representing the angular position of its rotor in a vectorial system, comprising:

(a) modifying the output signals of said transducer to shift the angular position represented by said output signals in said vectorial system, (b) locking the position of the rotor of said transducer while allowing the rotor of said motor to freely rotate, (c) energizing the motor with said modified signals to cause the rotor of said motor to rotate until it is aligned with the angular position represented by said modified signals in said vectorial system, and (d) locking the rotors of said motor and said transducer in a fixed position relative to one another.

3. A circuit according to claim 1, wherein the precision resolver type of angular position transducer is of a two-phase type and is connected to a Scott transformer for three-phase conversion.

4. A circuit according to claim 1, wherein said motor is a two-phase motor, and the precision synchro type of angular position transducer is connected to a Scott transformer.

5. A circuit according to claim 1, wherein said phase shifting means includes a circuit comprising impedances and at least one changeover switch element for each demodulated signal.

6. A circuit according to claim 1, wherein said signal amplitude modifying means comprise at least one multiplying element.

7. A circuit according to claim 6, wherein said multiplying element is connected between the transducer and the amplifier.

8. A circuit according to claim 6, wherein said transducer is energized with a carrier signal and said multiplying element is connected to modify the amplitude of said carrier signal for said transducer and accordingly the output signals of said transducer.

* * * * *